United States Patent
Wu et al.

(10) Patent No.: US 11,569,714 B2
(45) Date of Patent: Jan. 31, 2023

(54) MOTOR AND HAIRPIN STATOR THEREOF

(71) Applicant: DELTA ELECTRONICS, INC., Taoyuan (TW)

(72) Inventors: Yi-Ming Wu, Taoyuan (TW); Yao-Hsien Shao, Taoyuan (TW); Yu-Kuan Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 136 days.

(21) Appl. No.: 17/246,738

(22) Filed: May 3, 2021

(65) Prior Publication Data
US 2022/0140703 A1 May 5, 2022

(30) Foreign Application Priority Data

Nov. 5, 2020 (CN) .......................... 202011222701.1

(51) Int. Cl.
| | |
|---|---|
| *H02K 11/25* | (2016.01) |
| *H02K 21/14* | (2006.01) |
| *H02K 3/28* | (2006.01) |
| *H02K 1/276* | (2022.01) |

(52) U.S. Cl.
CPC ............ *H02K 11/25* (2016.01); *H02K 1/276* (2013.01); *H02K 3/28* (2013.01); *H02K 21/14* (2013.01)

(58) Field of Classification Search
CPC .......... H02K 11/25; H02K 1/276; H02K 3/28; H02K 21/14; H02K 3/12; H02K 1/165; H02K 3/04; H02K 3/505
USPC ...................................................... 310/68 C
See application file for complete search history.

(56) References Cited

U.S. PATENT DOCUMENTS

| | | | |
|---|---|---|---|
| 6,028,382 A | 2/2000 | Blalock | |
| 2009/0140614 A1* | 6/2009 | Heim ..................... | H02K 11/25 310/68 C |
| 2013/0156071 A1 | 6/2013 | Wan et al. | |

(Continued)

FOREIGN PATENT DOCUMENTS

| | | |
|---|---|---|
| CN | 209462100 U | 10/2019 |
| CN | 209659099 U | 11/2019 |

(Continued)

OTHER PUBLICATIONS

The pertinent parts of US20130156071A1.

*Primary Examiner* — Ahmed Elnakib
(74) *Attorney, Agent, or Firm* — CKC & Partners Co., LLC (57) ABSTRACT

A hairpin motor stator includes a stator core, a plurality of slots, a first hairpin wire and a temperature sensor. The stator core defines a rotor accommodating space. The slots are located on the stator core, and each slot extends in a radial direction from the rotor accommodating space. Each slot has a side opening adjacent to the rotor accommodating space. One of the slots is a temperature sensor accommodating slot. The first hairpin wire is located in the temperature sensor accommodating slot and proximal to the side opening of the temperature sensor accommodating slot. The temperature sensor is between the side opening of the temperature sensor accommodating slot and the first hairpin wire. The temperature sensor is larger than the side opening of the temperature sensor accommodating slot such that the temperature sensor is enclosed in the temperature sensor accommodating slot.

19 Claims, 10 Drawing Sheets

(56) References Cited

U.S. PATENT DOCUMENTS

| | | | | |
|---|---|---|---|---|
| 2013/0320817 A1* | 12/2013 | Marschall | ............... | H02K 11/25 310/68 C |
| 2014/0191629 A1* | 7/2014 | Takahashi | ............... | H02K 11/25 310/68 C |
| 2016/0094102 A1* | 3/2016 | Hoshina | ................ | H02K 11/25 310/71 |
| 2016/0380518 A1* | 12/2016 | Deubler | ................ | H02K 11/25 310/68 C |
| 2020/0169135 A1* | 5/2020 | Totsuka | .................. | H02K 5/04 |
| 2022/0140703 A1* | 5/2022 | Wu | ........................ | H02K 11/25 310/68 C |

FOREIGN PATENT DOCUMENTS

| | | |
|---|---|---|
| DE | 102008031582 A1 | 1/2010 |
| EP | 1322026 A1 | 6/2003 |
| JP | 5344254 B2 | 11/2013 |
| JP | 2018170924 A | 11/2018 |
| KR | 100952226 B1 | 4/2010 |

\* cited by examiner

MOTOR AND HAIRPIN STATOR THEREOF

CROSS-REFERENCE TO RELATED APPLICATION

This application claims priority to China Application Serial Number 202011222701.1, filed Nov. 5, 2020, which is herein incorporated by reference in its entirety.

BACKGROUND

Field of Invention

The present disclosure relates to a motor and its stator, and more particularly to a motor stator and its stator including hairpin wires.

Description of Related Art

Conventional operation control of a motor is limited by the measurement accuracy of a temperature sensor inside the motor. Typically a larger hypothetical temperature difference is used as a temperature buffer to protect the motor, which can be too conservative in motor operation control. The conventional motor stator does not have a suitable temperature sensor accommodating space, resulting in the temperature sensor unable to measure the hot spots accurately during motor operation. In view of such issue, motor manufacturers are actively looking for solutions that can reduce the temperature difference between actual and measured during motor operation, in order to better control motor operations and improve motor performance.

SUMMARY

The present disclosure proposes a motor stator and motor thereof for overcoming or alleviating the problems of the prior art.

In one or more embodiments, a hairpin wire motor stator includes a stator core, a plurality of slots, a first hairpin wire and a temperature sensor. The stator core includes a ring-shaped body defining a rotor accommodation space at a center of the ring-shaped body, wherein the stator core includes an insertion side and extension side. The plurality of slots is disposed on the stator core and surrounding the rotor accommodation space circumferentially. Each slot extends in a radial direction from the rotor accommodation space and allows a plurality of hairpin wires to be inserted from the insertion side and protruded out from the extension side, wherein the plurality of hairpin wires are arranged in layers inside each slot, wherein each slot has a side opening adjacent to the rotor accommodation space, and wherein at least one of the slots is a temperature sensor accommodation slot. The first hairpin wire is located in the temperature sensor accommodation slot and located proximal to the side opening of the temperature sensor accommodation slot. The temperature sensor is disposed between the side opening of the temperature sensor accommodation slot and the first hairpin wire, wherein the temperature sensor is larger than the side opening of the temperature sensor accommodation slot such that the temperature sensor is enclosed within the temperature sensor accommodation slot, and wherein at the insertion side of the stator core, a profile of the temperature sensor accommodation slot is different than a profile of one of the plurality of slots except for the temperature sensor accommodation slot.

In one or more embodiments, a motor includes a rotor, a ring-shaped stator core, a plurality of slots, a temperature sensor, a first hairpin wire and a second hairpin wire. The ring-shaped stator core surrounds the rotor. The plurality of slots is arranged circumferentially on the ring-shaped stator core. Each slot extends in a radial direction from the rotor and includes a plurality of layers of hairpin wires disposed in the slot, wherein at least one of the slots is a temperature sensor accommodation slot. The temperature sensor is disposed in the temperature sensor accommodation slot, wherein the temperature sensor accommodation slot is elongate in the radial direction and has two ends, wherein the temperature sensor is located at one of the two ends. The first hairpin wire is located in the temperature sensor accommodation slot adjacent to the temperature sensor, wherein the first hairpin wire includes a temperature sensor accommodating section configured to thermally contact the temperature sensor. The second hairpin wire is disposed adjacent to the first hairpin wire and distal to the temperature sensor, wherein the temperature sensor accommodating section of the first hairpin wire and the second hairpin wire have different cross-sectional shapes and further have the same or substantially the same cross-sectional area.

In one or more embodiments, a motor includes a rotor, a stator core, a plurality of slots and a temperature sensor. The stator core is ring-shaped to define a rotor accommodation space, wherein the stator core includes an insertion side and extension side. The rotor is disposed in the rotor accommodation space. The plurality of slots is arranged on the stator core and surrounding the rotor accommodation space circumferentially. Each slot extends in a radial direction from the rotor accommodation space and includes a plurality of inserted hairpin wire layers, wherein at least one of the slots is a temperature sensor accommodation slot. The temperature sensor is disposed in the temperature sensor accommodation slot between the insertion side and the extension side, wherein the temperature sensor accommodation slot includes a slot cross-sectional area, wherein the slot cross-sectional area at the insertion side is greater than the slot cross-sectional area at the extension side, wherein the slot cross-sectional area is reduced from the slot cross-sectional area of the insertion side to the slot cross-sectional area of the extension side at an axial portion of the temperature sensor accommodation slot located between the insertion side and the extension side, and wherein the axial portion is configured to accommodate the temperature sensor.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments, examples of which are illustrated in the accompanying drawings. Wherever possible, the same reference numbers are used in the drawings and the description to refer to the same or like parts.

Figure 1A:
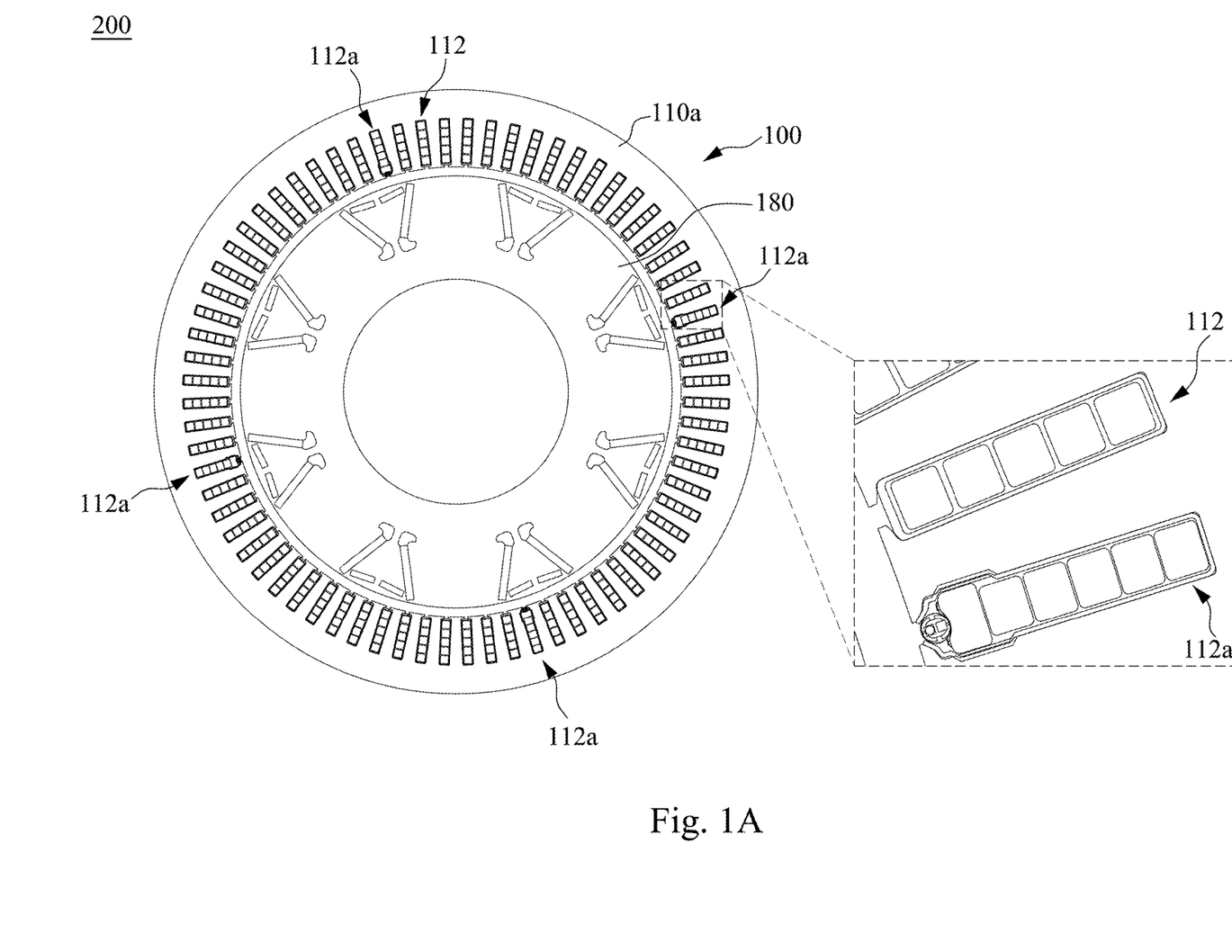
FIG. 1A illustrates a motor viewed axially from one side, according to an embodiment of the present disclosure.
Figure 1B:
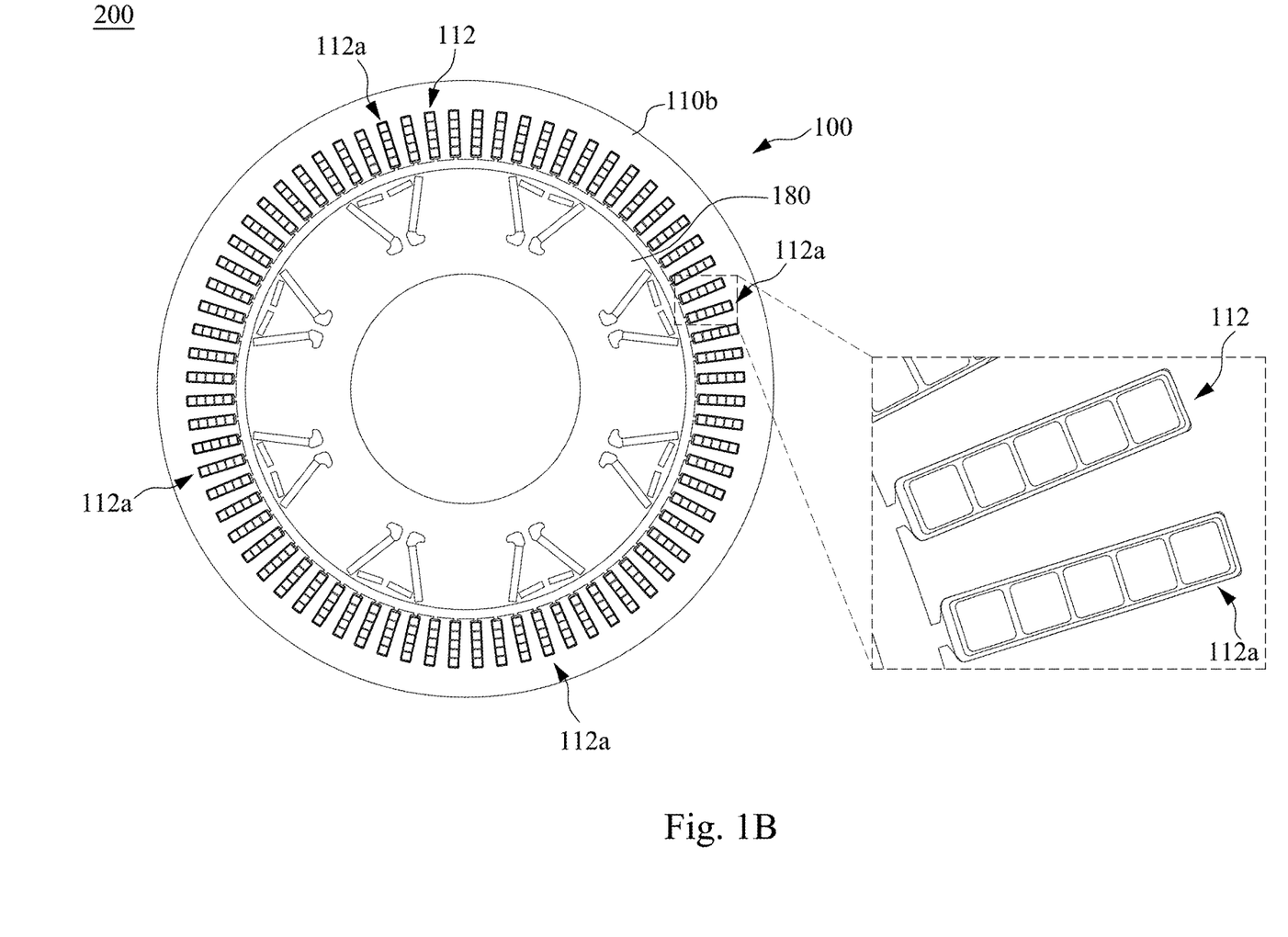
FIG. 1B illustrates a motor viewed axially from an opposite side of the motor in FIG. 1A, according to an embodiment of the present disclosure.

Reference is made to FIGS. 1A and 1B, which illustrate a motor from two opposite sides (i.e., an insertion side 110a and an extension side 110b) according to an embodiment of the present disclosure. A motor 200 includes a stator 100 and a rotor 180. When the stator 100 is energized and excited, it drives the rotor 180 inside thereof to rotate. When the motor 200 is operating, a temperature of the stator 100 and rotor 180 will increase significantly. Even if the motor 200 is cooled (for example, the motor is cooled by a liquid cooling system), there still are many hot spots inside the motor that cannot be cooled immediately (for example, hot spots inside the stator 100 cannot be cooled immediately). If the actual temperatures of these hot spots cannot be more accurately measured when the motor 200 is in operation, the motor operation or cooling control may suffer, and the performance of the motor is affected.

Figure 2:
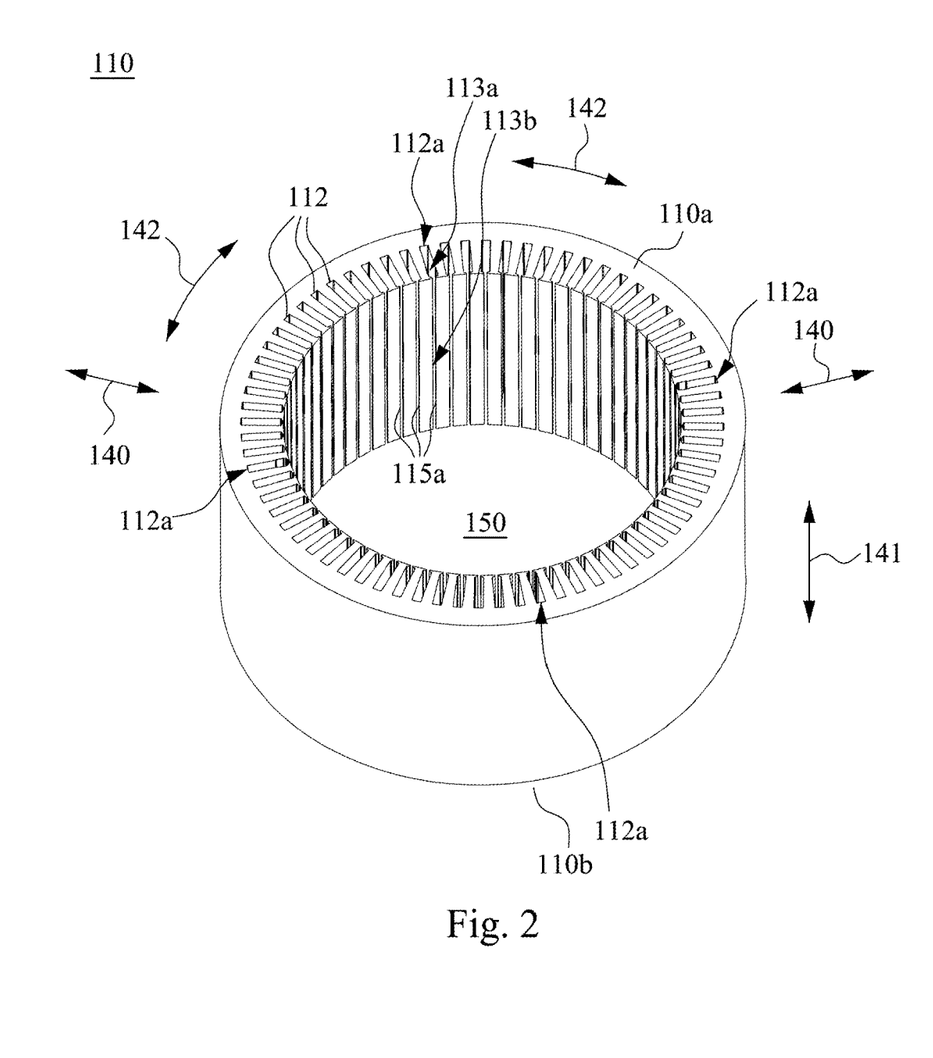
FIG. 2 illustrates a perspective view of a stator core according to an embodiment of the present disclosure.
Figure 3:
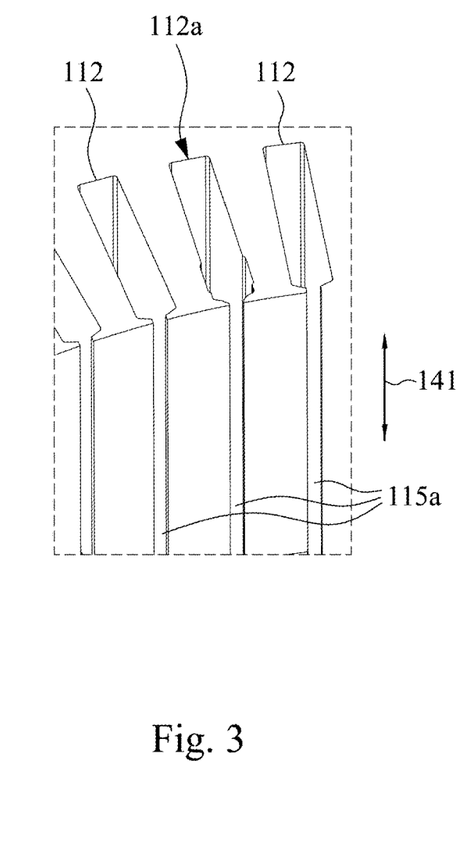
FIG. 3 illustrates an enlarged view of a portion of the stator core in FIG. 2.

Reference is made to FIGS. 2 and 3, FIG. 2 illustrates a perspective view of a stator core according to an embodiment of the present disclosure, and FIG. 3 illustrates an enlarged view of a portion of the stator core in FIG. 2. A ring-shaped stator core 110 defines a rotor accommodation space 150 in a central part thereof to surround and accommodate the rotor 180 (referring to FIGS. 1A and 1B). The stator core 110 includes an insertion side 110a and an extension side 110b, which are two opposite sides of the stator core 110, respectively. The stator core 110 has a plurality of slots 112 surrounding the rotor accommodation space 150 in a circumferential direction 142. Each slot 112 extends in a radial direction 140 of the stator core 110 from the rotor accommodation space 150 to accommodate the hairpin wires arranged in layers (referring to FIGS. 1A and 1B for the hairpin wires of multi-layers). Each slot 112 has a side opening 115a adjacent to the rotor accommodation space 150, and the space in each slot 112 can be connected to the rotor accommodation space 150 through the side opening 115a. Each slot 112 penetrates through the stator core 110 in an axial direction 141, and the side opening 115a also extends in the axial direction 141.

At least one of the slots 112 of the stator core 110 is a temperature sensor accommodation slot 112a. The temperature sensor accommodation slot 112a is different from other slots 112 in structure for placing the temperature sensor, which will be discussed in more detail in the following paragraphs.

Figure 4:
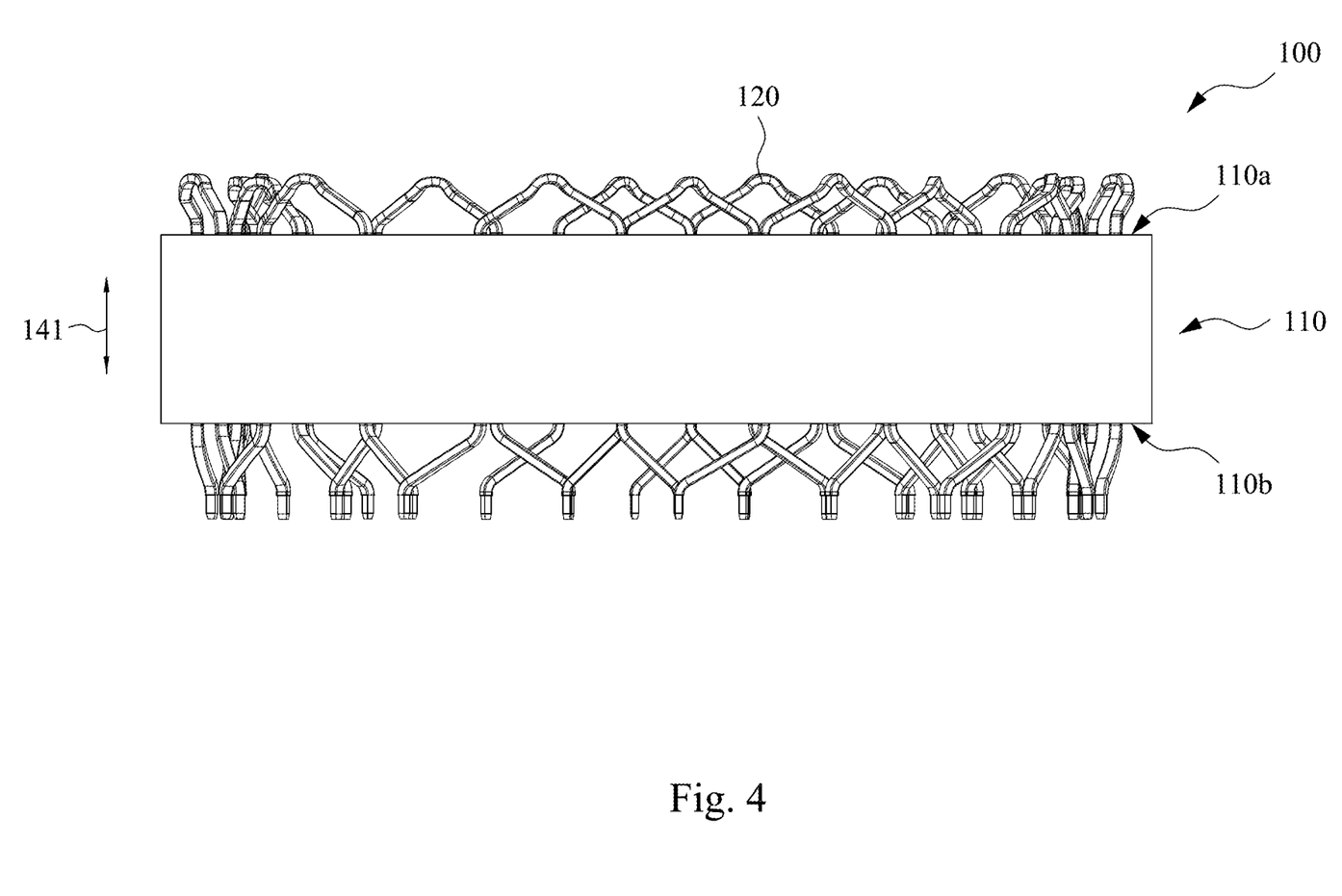
FIG. 4 illustrates a side view of the stator core with hairpin wires inserted according to an embodiment of the present disclosure.
Figure 5:
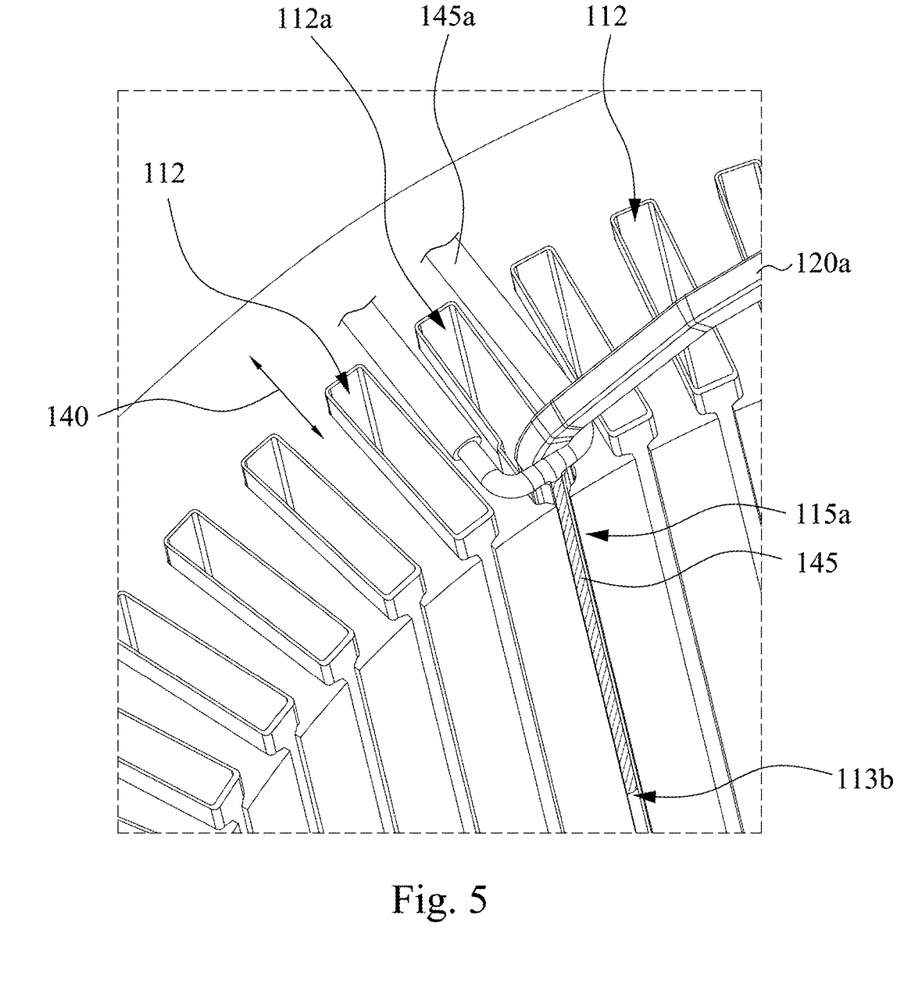
FIG. 5 illustrates an enlarged perspective view of a portion of a motor stator according to an embodiment of the present disclosure.

Reference is made to FIGS. 4 and 5, FIG. 4 illustrates a side view of the stator core with hairpin wires inserted according to an embodiment of the present disclosure, and FIG. 5 illustrates an enlarged perspective view of a portion of a motor stator according to an embodiment of the present disclosure. The multiple slots 112 of the stator core 110 are provided for the hairpin wires 120 to be inserted in axial direction 141 of the stator core from the insertion side 110a and protruded out from the extension side 110b (see also FIG. 2). One of these slots 112 is configured to be a temperature sensor accommodation slot 112a. In addition to accommodating the hairpin wire, the temperature sensor accommodation slot 112a also accommodates the temperature sensor 145. The temperature sensor 145 is located proximal to the side opening 115a of the temperature sensor accommodation slot 112a. The first hairpin wire 120a is a wire adjacent to the temperature sensor 145. Compared with other hairpin wires, it has a structurally different design to fit the temperature sensor in the slot. The temperature sensor 145 is arranged in the temperature sensor accommodation slot 112a close to the rotor accommodation space 150, and can be clamped between the side opening 115a and the first hairpin wire 120a, such that the vibration during the operation of the motor has a low impact on it. The temperature sensor 145 can be electrically connected to the controller of the motor by a measurement wire 145a to transmit the measurement result that is utilized by the controller of the motor. The temperature sensor accommodation slot 112a and other slots 112 have different profiles (illustrated in FIG. 3), e.g., the temperature sensor accommodation slot 112a is partially enlarged in width to receive the temperature sensor 145, but still maintain the same length in the radial direction 140 of the stator core 110. This design can reduce the influence of the temperature sensor accommodation slot 112a on the performance of the motor stator. The temperature sensor 145 is larger than the side opening 115a, so that the temperature sensor 145 is enclosed within the temperature sensor accommodation slot 112a, so as to prevent the temperature sensor 145 from reaching into the rotor accommodation space 150 to contact the rotor 180 and causing damages. In this embodiment, the temperature sensor 145 is an elongated sensor, or can be a negative temperature coefficient thermistor, but not being limited thereto.

Figure 6:
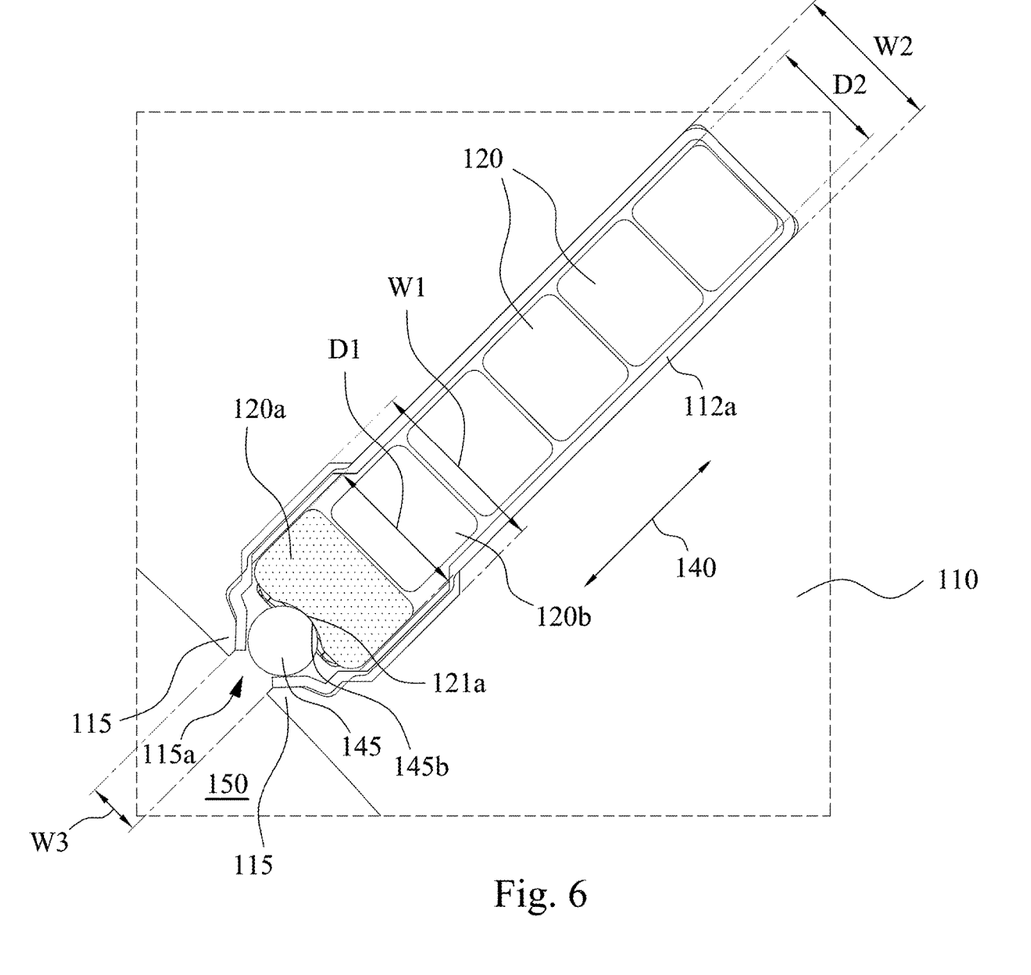
FIG. 6 illustrates a cross-sectional view of a temperature sensor accommodating slot of a motor stator according to an embodiment of the present disclosure.

Reference is made to FIG. 6, which illustrates a cross-sectional view of a temperature sensor accommodating slot of a motor stator according to an embodiment of the present disclosure. The temperature sensor accommodation slot 112a houses the temperature sensor 145 and the hairpin wires. The side opening 115a of the temperature sensor accommodation slot 112a has two lip portions 115, which extend toward each other from two sides of the temperature sensor accommodation slot 112a, thereby defining a side opening width W3. The side opening width W3 is smaller than a width (W1 or W2) between the two sides of the temperature sensor accommodation slot 112a for enclosing the temperature sensor 145 within the temperature sensor accommodation slot.

The temperature sensor accommodation slot 112a is elongate in the radial direction 140 of the stator core, and has the width (W1, W2) orthogonal to the radial direction. The width of the temperature sensor accommodation slot 112a varies in the radial direction 140. For example, the width W1 of the temperature sensor accommodation slot 112a proximal to the rotor accommodation space 150 is greater than the width W2 distal to the rotor accommodation space 150. For another example, the width W1 of the temperature sensor accommodation slot where the first hairpin wire 120a is accommodated is greater than the side opening width W3 of the temperature sensor accommodation slot near where the temperature sensor 145 is accommodated, and is also greater than the width W2 of the temperature sensor accommodation slot where the second hairpin wire 120b is accommodated.

In addition to accommodating the temperature sensor 145, the temperature sensor accommodation slot 112a also accommodates the first hairpin wire 120a, the second hairpin wire 120b and other hairpin wires 120. The first hairpin wire 120a is adjacent to the temperature sensor 145 and close to the side opening 115a. The second hairpin wire 120b is adjacent to the first hairpin wire 120a and further away from the temperature sensor 145, and is adjacent to the other side of the first hairpin wire 120a relative to the temperature sensor 145. The first hairpin wire 120a and the second hairpin wire 120b have different cross-sectional shapes, but have the same or substantially the same cross-sectional area, so as to maintain a similar current density.

In this embodiment, the cross section shape of the first hairpin wire 120a and the cross section shape of the second hairpin wire 120b are both substantially quadrilateral, and a width D1 of the first hairpin wire is greater than a width D2 of the second hairpin wire, but not being limited thereto. The temperature sensor 145 has a convex side 145b, which is in thermal contact with the first hairpin wire 120a. The first hairpin wire 120a has a corresponding concave side 121a for receiving the convex side 145b of the temperature sensor 145. In this embodiment, the concave side 121a of the first hairpin wire 120a may be a curved wire gap, but not being limited thereto.

Figure 7:
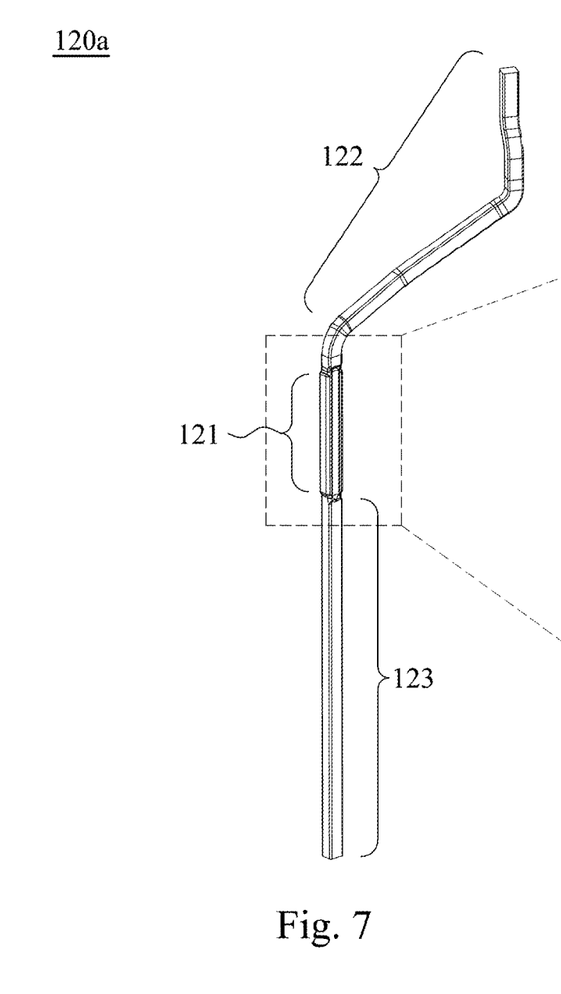
FIG. 7 illustrates a perspective view of a hairpin wire according to an embodiment of the present disclosure.
Figure 8:
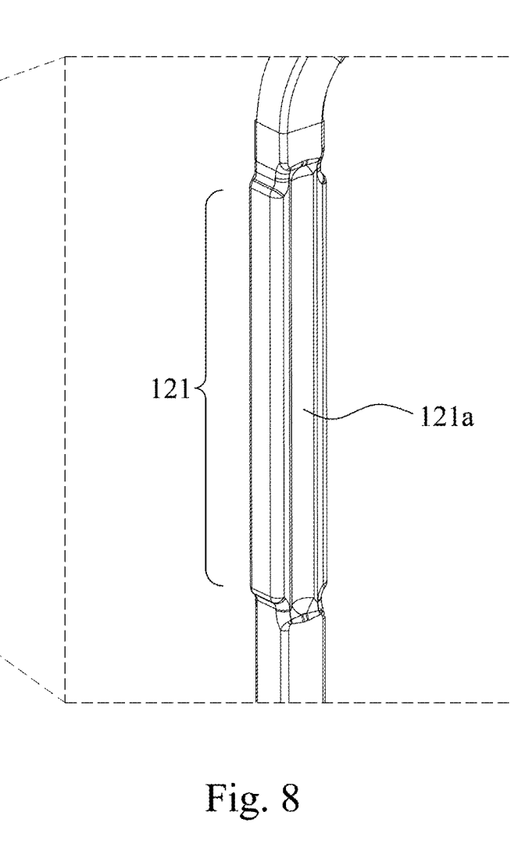
FIG. 8 illustrates an enlarged view of a portion of the hairpin wire in FIG. 7.

Reference is made to FIGS. 7 and 8, FIG. 7 illustrates a perspective view of a hairpin wire according to an embodiment of the present disclosure, and FIG. 8 illustrates an enlarged view of a portion of the hairpin wire in FIG. 7. The first hairpin wire 120a has a temperature sensor accommodating section 121 for thermally contacting the temperature sensor. The temperature sensor accommodating section 121 has the concave side 121a for receiving the convex side of the temperature sensor. In this embodiment, the cross section of the first hairpin wire 120a in FIG. 6 is the cross section of the temperature sensor accommodating section 121 of the first hairpin wire 120a. The cross-sections of the remaining sections (122, 123) of the first hairpin wire 120a and the temperature sensor accommodating section 121 have different cross-sectional shapes, e.g., a width D1 of the cross-sectional shape of the temperature sensor accommodating section 121 of the first hairpin wire 120a is greater than a width of the cross-sectional shape of the remaining sections (122, 123) of the first hairpin wire 120a, or greater than a width D2 of the cross-sectional shape of the second hairpin wire 120b (referring to FIG. 6), but these cross-sectional shapes of the first and second hairpin wires have the same or substantially the same cross-sectional area, so as to maintain a similar current density. The cross section of the insertion side section 122 and the other section 123 of the first hairpin wire 120a are the same or substantially the same as the cross section of the second hairpin wire 120b or other hairpin wires 120 in FIG. 6. In one embodiment, the first hairpin wire 120a is a neutral wire (i.e., a wire connected to the neutral terminal), but not being limited thereto. A neutral wire is less likely to have voltage level which could cause damage to the temperature sensor. The second hairpin wire 120b or other hairpin wires 120 do not have the temperature sensor accommodating section configuration, so all sections of the wire have the same or substantially the same cross-sectional shape and area.

Figure 9:
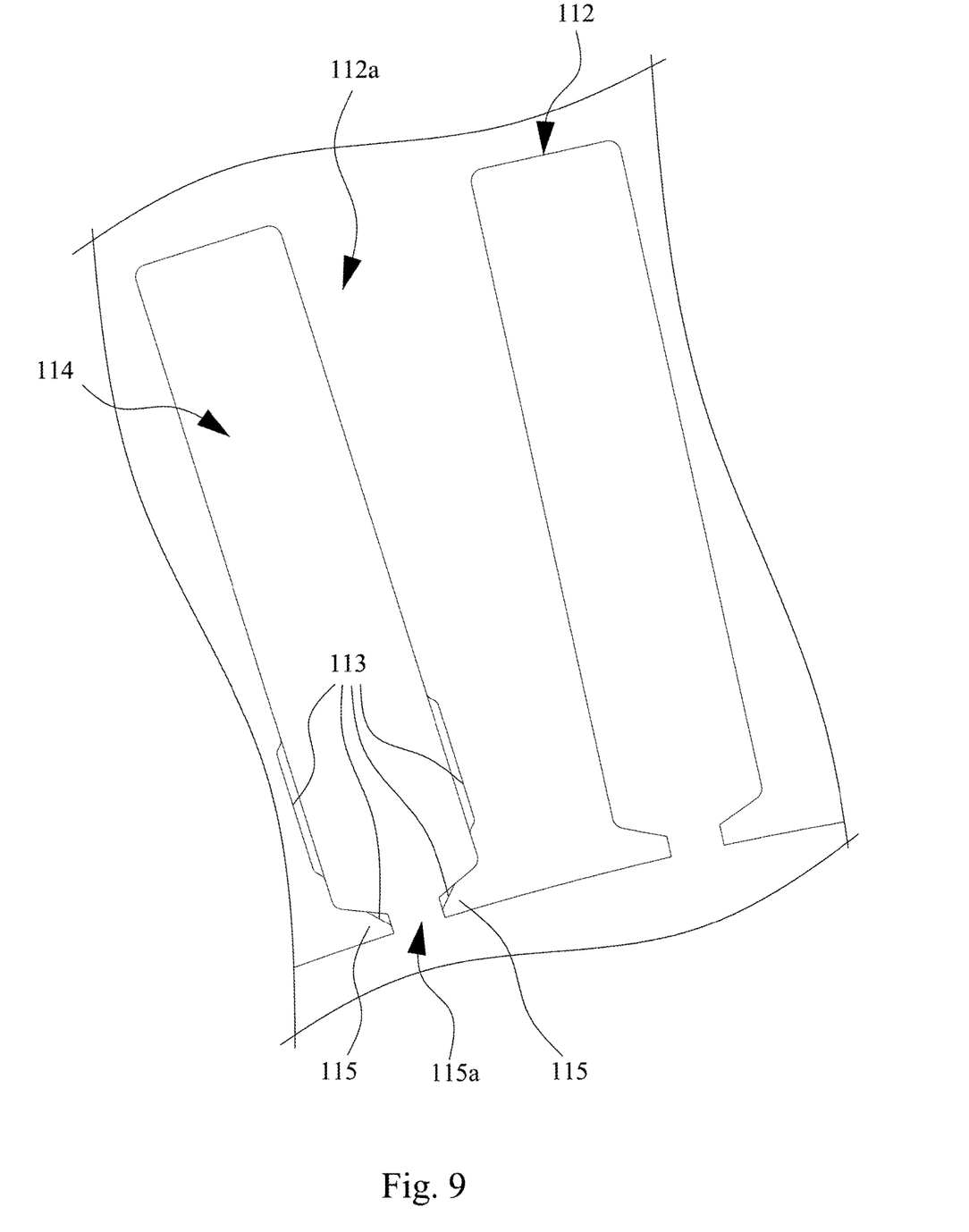
FIG. 9 illustrates a temperature sensor accommodating slot of a motor stator viewed axially from one side, according to an embodiment of the present disclosure.
Figure 10:
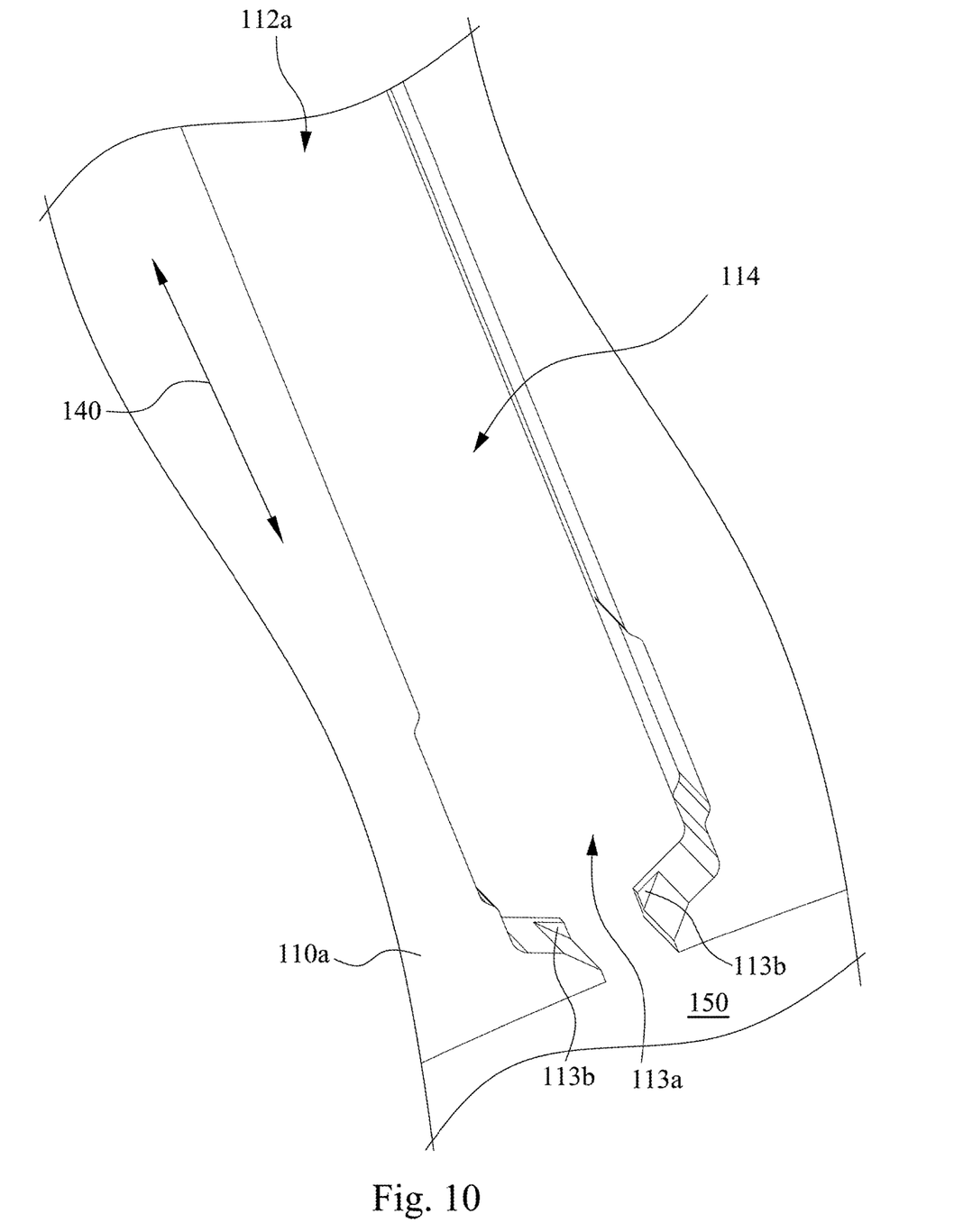
FIG. 10 illustrates a perspective view of a temperature sensor accommodating slot according to an embodiment of the present disclosure.

Reference is made to FIGS. 9 and 10, FIG. 9 illustrates a temperature sensor accommodating slot of a motor stator viewed axially from one side, according to an embodiment of the present disclosure, and FIG. 10 illustrates a perspective view of a temperature sensor accommodating slot according to an embodiment of the present disclosure. The temperature sensor accommodation slot 112a includes a through hole portion 114 extending in an axial direction of the stator core and a space adjacent to the through hole portion 114 configured as a well portion 113. The well portion 113 may have multiple features as shown in FIG. 9. A hairpin wire is inserted into the through hole portion 114 from the insertion side of the stator core and protruded out from the extension side of the stator core. In other words, the through hole portion 114 is a hairpin wire accommodation space of the temperature sensor accommodation slot. An opening 113a of the well portion 113 is located at the insertion side of the stator core, a bottom end 113b of the well portion 113 is located inside the temperature sensor accommodation slot between the insertion side and the insertion side, and the temperature sensor 145 is located at or proximal to the bottom end 113b of the well portion 113 (referring to FIGS. 2 and 5 at the same time). When the motor is operating, the temperature sensor 145 is operable to sense a temperature hot spot near the bottom end 113b of the well portion 113. The temperature sensor accommodating section 121 of the first hairpin wire 120a (see FIGS. 7 and 8 at the same time) is also contained in the well portion 113. An elongate space is formed in the well portion 113. The first end of the elongate space is located on the insertion side of the stator core (i.e., the opening 113a of the well portion 113), and the second end of the elongate space is located inside the stator core (i.e., located at or proximal to the bottom end 113b of the well portion 113). That is, the elongate space extends from the insertion side of the stator core and terminates inside the stator core to form a bottom end. The temperature sensor 145 can be located at or proximal to the second end of the elongate space for sensing a hot spot inside the stator core.

Reference is made to FIGS. 1A, 1B, 2, 9, 10, the temperature sensor accommodation slot 112a has the well portion 113 configured such that the slot cross-sectional area of the slot section on the insertion side 110a of the stator core is greater than the slot cross-sectional area on the extension side 110b of the stator core (see partial enlarged view of the temperature sensor accommodation slot 112a in FIGS. 1A and 1B). The slot cross-sectional area of the temperature sensor accommodation slot 112a is reduced from the slot cross-sectional area of the insertion side 110a to the slot cross-sectional area of the extension side 110b at an axial portion of the temperature sensor accommodation slot 112a (e.g. at the bottom end 113b of the well portion 113). The temperature sensor accommodation slot 112a and other slots have the same or substantially the same slot cross-sectional area and shape at the extension side 110b of the stator core (referring to the enlarged view of FIG. 1B). The axial portion of the bottom end 113b of the well portion 113 is located proximal to the rotor accommodation space 150 in the radial direction 140, and is used for accommodating the temperature sensor 145 which senses the nearby temperature hot spots.

Figure 11:
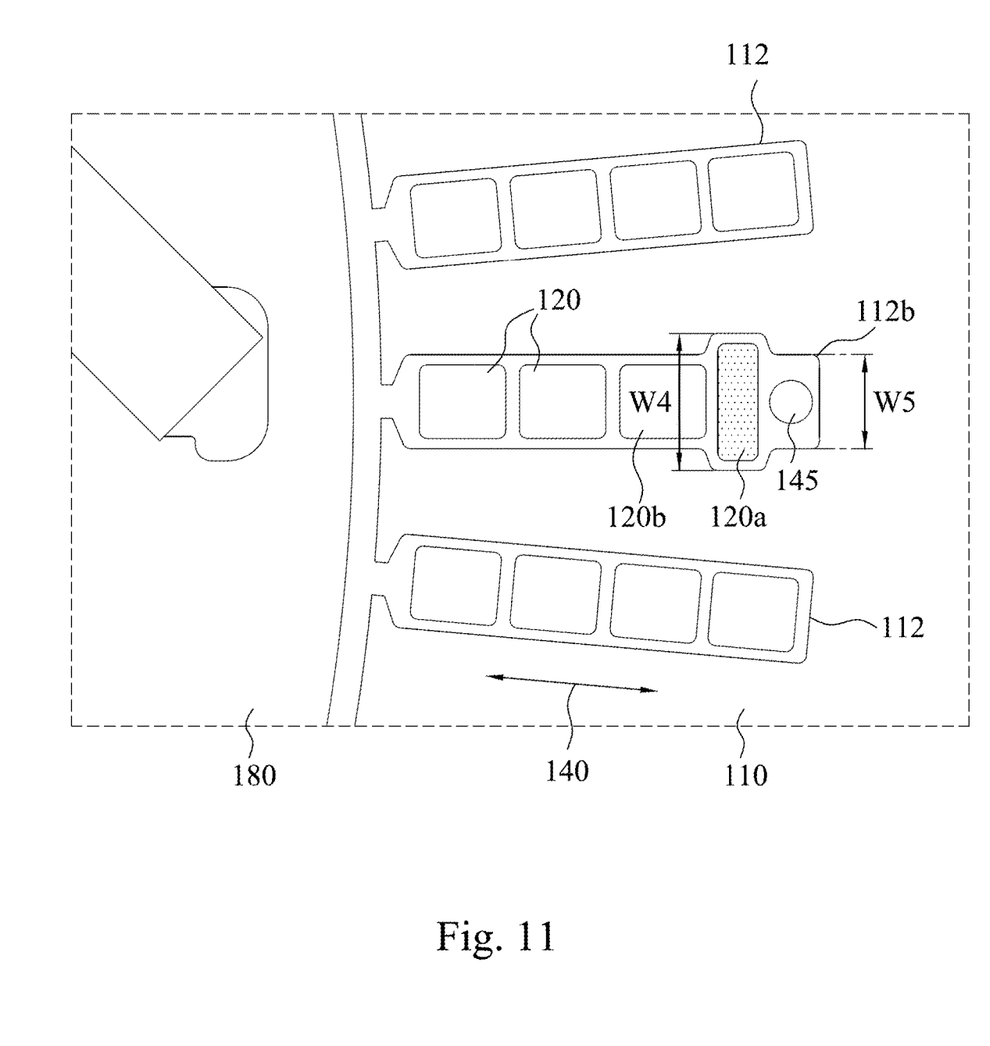
FIG. 11 illustrates a cross-sectional view of a portion of a motor according to another embodiment of the present disclosure.

Reference is made to FIG. 11, which illustrates a cross-sectional view of a portion of a motor according to another embodiment of the present disclosure. The temperature sensor accommodation slot 112b depicted in this drawing is different from the temperature sensor accommodation slot 112a of the other described embodiments, in that the temperature sensor 145 and the first hairpin wire 120a are located at an end of the temperature sensor accommodation slot 112b distal to the rotor 180, rather than an end proximal to the rotor 180. In a cross-sectional view, a width W4 of the temperature sensor accommodation slot 112b where the first hairpin wire 120a is accommodated is greater than a width W5 of the temperature sensor accommodation slot where the temperature sensor 145 is accommodated. Similar to the other embodiments, the temperature sensor accommodation slot 112b and other temperature sensor accommodation slots 112 have the same length in the radial direction 140 of the stator core 110. The first hairpin wire 120a and the other hairpin wires 120 have different cross-sectional shapes, but have the same or substantially the same cross-sectional area so as to reduce an impact of the temperature sensor accommodation slot 112b on the performance of the motor stator.

The hairpin wire stator and its motor disclosed herein are designed with a temperature sensor accommodation slot such that the temperature sensor can be positioned in an appropriate position in the stator, so as to sense the temperature hot spots during operation. Compared with other hairpin wires, a cross-sectional shape of the hairpin wire adjacent to the temperature sensor in the temperature sensor accommodation slot is different to fit with the configuration of the temperature sensor, but maintaining its cross-sectional area to maintain a similar current density. By accurately measuring the temperature hot spots when the motor is operating, an operating efficiency of the motor can be better controlled, thereby improving the overall performance of the motor.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A hairpin wire motor stator comprising:
a stator core comprising a ring-shaped body defining a rotor accommodation space at a center of the ring-shaped body, wherein the stator core comprises an insertion side and extension side;
a plurality of slots disposed on the stator core and surrounding the rotor accommodation space circumferentially, each slot extending in a radial direction from the rotor accommodation space and allowing a plurality of hairpin wires to be inserted from the insertion side and protruded out from the extension side, wherein the plurality of hairpin wires are arranged in layers inside each slot, wherein each slot has a side opening adjacent to the rotor accommodation space, and wherein at least one of the slots is a temperature sensor accommodation slot;
a first hairpin wire disposed in the temperature sensor accommodation slot and located proximal to the side opening of the temperature sensor accommodation slot; and
a temperature sensor disposed between the side opening of the temperature sensor accommodation slot and the first hairpin wire, wherein the temperature sensor is larger than the side opening of the temperature sensor accommodation slot such that the temperature sensor is enclosed within the temperature sensor accommodation slot, and wherein at the insertion side of the stator core, a profile of the temperature sensor accommodation slot is different than a profile of one of the plurality of slots except for the temperature sensor accommodation slot.

2. The hairpin wire motor stator of claim 1, wherein the temperature sensor accommodation slot includes at least one through hole portion extending in an axial direction of the stator core allowing a hairpin wire to be inserted from the insertion side and protruded out from the extension side, and wherein the temperature sensor is located in the temperature sensor accommodation slot between the insertion side and the extension side to sense a hot spot of the hairpin wire motor stator.

3. The hairpin wire motor stator of claim 2, wherein the temperature sensor accommodation slot includes at least one well portion adjacent to the through hole portion, the well portion comprising an opening at the insertion side, and a bottom located between the insertion side and the extension side, and wherein the temperature sensor is located at or proximal to the bottom of the well portion.

4. The hairpin wire motor stator of claim 1, wherein the temperature sensor accommodation slot is elongate in the radial direction and comprises a width orthogonal to the radial direction, wherein the width of the temperature sensor accommodation slot varies in the radial direction in a configuration of the width proximal to the rotor accommodation space being greater than the width distal to the rotor accommodation space.

5. The hairpin wire motor stator of claim 1, wherein the side opening of the temperature sensor accommodation slot comprises two lip portions extending toward each other from two sides of the temperature sensor accommodation slot to define a side opening width, wherein the side opening width is smaller than a width between the two sides of the temperature sensor accommodation slot for enclosing the temperature sensor within the temperature sensor accommodation slot.

6. The hairpin wire motor stator of claim 1, further comprising a second hairpin wire disposed adjacent to the first hairpin wire and distal to the temperature sensor, wherein the first hairpin wire comprises a temperature sensor accommodating section configured to thermally contact the temperature sensor, wherein the temperature sensor accommodating section of the first hairpin wire comprises a different cross-sectional shape than a cross-sectional shape of the second hairpin wire, and wherein a cross-sectional area of the temperature sensor accommodating section of the first hairpin wire and a cross-sectional area of the second hairpin wire are the same or substantially the same.

7. The hairpin wire motor stator of claim 6, wherein the cross-sectional shape of the temperature sensor accommodating section of the first hairpin wire and the cross-sectional shape of the second hairpin wire are both substantially quadrilateral, and wherein a width of the cross-sectional shape of the temperature sensor accommodating section of the first hairpin wire is greater than a width of the cross-sectional shape of the second hairpin wire.

8. The hairpin wire motor stator of claim 6, wherein the temperature sensor comprises a convex side configured to be in thermal contact with the first hairpin wire, and wherein the temperature sensor accommodating section of the first hairpin wire comprises a concave side configured to receive the convex side of the temperature sensor.

9. The hairpin wire motor stator of claim 6, wherein the temperature sensor accommodating section and a other section of the first hairpin wire comprise different cross-sectional shapes and further comprise the same or substantially the same cross-sectional area.

10. The hairpin wire motor stator of claim 1, wherein the first hairpin wire is a neutral wire.

11. A motor comprising:
  a rotor;
  a ring-shaped stator core surrounding the rotor;
  a plurality of slots disposed circumferentially on the ring-shaped stator core, each slot extending in a radial direction from the rotor and comprising a plurality of layers of hairpin wires disposed in the slot, wherein at least one of the slots is a temperature sensor accommodation slot;
  a temperature sensor disposed in the temperature sensor accommodation slot, wherein the temperature sensor accommodation slot is elongate in the radial direction and comprises two ends, wherein the temperature sensor is located at one of the two ends;
  a first hairpin wire disposed in the temperature sensor accommodation slot adjacent to the temperature sensor, wherein the first hairpin wire comprises a temperature sensor accommodating section configured to thermally contact the temperature sensor; and
  a second hairpin wire disposed adjacent to the first hairpin wire and distal to the temperature sensor, wherein the temperature sensor accommodating section of the first hairpin wire and the second hairpin wire comprise different cross-sectional shapes and further comprise the same or substantially the same cross-sectional area.

12. The motor of claim 11, wherein the temperature sensor comprises a convex side configured to be in thermal contact with the first hairpin wire, and wherein temperature sensor accommodating section of the first hairpin wire comprises a concave side configured to receive the convex side of the temperature sensor.

13. The motor of claim 11, wherein the temperature sensor accommodating section of the first hairpin wire and the second hairpin wire comprise substantially quadrilateral cross-sections, and wherein a width of the cross-sectional shape of the temperature sensor accommodating section of the first hairpin wire is greater than a width of the cross-sectional shape of the second hairpin wire.

14. The motor of claim 11, wherein the first hairpin wire is proximal to the rotor, wherein the second hairpin wire is distal to the rotor, and wherein the temperature sensor is disposed between the rotor and the first hairpin wire.

15. The motor of claim 11, wherein the temperature sensor accommodation slot comprises a width orthogonal to the radial direction, wherein the width of the temperature sensor accommodation slot varies in the radial direction in a configuration of the width for accommodating the first hairpin wire is greater than the width for accommodating the temperature sensor.

16. A motor comprising:
  a stator core ring-shaped to define a rotor accommodation space, wherein the stator core comprises an insertion side and extension side;
  a rotor disposed in the rotor accommodation space;
  a plurality of slots disposed on the stator core and surrounding the rotor accommodation space circumferentially, each slot extending in a radial direction from the rotor accommodation space and comprising a plurality of inserted hairpin wire layers, wherein at least one of the slots is a temperature sensor accommodation slot; and
  a temperature sensor disposed in the temperature sensor accommodation slot between the insertion side and the extension side, wherein the temperature sensor accommodation slot comprises a slot cross-sectional area, wherein the slot cross-sectional area at the insertion side is greater than the slot cross-sectional area at the extension side, wherein the slot cross-sectional area is reduced from the slot cross-sectional area of the insertion side to the slot cross-sectional area of the extension side at an axial portion of the temperature sensor accommodation slot located between the insertion side and the extension side, and wherein the axial portion is configured to accommodate the temperature sensor.

17. The motor of claim 16, wherein the temperature sensor accommodation slot comprises an elongate space and a hairpin wire accommodating space adjacent to each other, wherein the elongated space comprises a first end at the insertion side of the stator core and a second end inside the stator core, and wherein the temperature sensor is disposed proximal to the second end of the elongate space.

18. The motor of claim 16, wherein the temperature sensor accommodation slot includes a space for accommodating the temperature sensor, wherein the space for accommodating the temperature sensor extends from the insertion side of the stator core and terminates inside the stator core to form a bottom end, and wherein the temperature sensor is located proximal to the bottom end for sensing a hot spot inside the stator core.

19. The motor of claim 16, wherein the axial portion is further located proximal to the rotor accommodation space in the radial direction.

\* \* \* \* \*